(12) United States Patent
Yu et al.

(10) Patent No.: US 11,738,793 B2
(45) Date of Patent: Aug. 29, 2023

(54) MOVABLE OBJECT WITH STEERING CONTROL

(71) Applicants: Hyundai Motor Company, Seoul (KR); Kia Motors Corporation, Seoul (KR)

(72) Inventors: Geun Sang Yu, Chungcheongnam-do (KR); Hun Keon Ko, Gyeonggi-do (KR); Joo Young Chun, Seoul (KR); Eun Ho Seo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 263 days.

(21) Appl. No.: 17/106,564

(22) Filed: Nov. 30, 2020

(65) Prior Publication Data

US 2021/0380156 A1 Dec. 9, 2021

(30) Foreign Application Priority Data

Jun. 8, 2020 (KR) .......................... 10-2020-0069153

(51) Int. Cl.
| | |
|---|---|
| *B62D 1/02* | (2006.01) |
| *B62D 9/00* | (2006.01) |
| *B62D 7/20* | (2006.01) |
| *B62D 5/00* | (2006.01) |

(52) U.S. Cl.
CPC .................. *B62D 1/02* (2013.01); *B62D 5/00* (2013.01); *B62D 7/20* (2013.01); *B62D 9/00* (2013.01)

(58) Field of Classification Search
CPC .......... B60K 7/0007; B62D 1/02; B62D 5/00; B62D 5/0403; B62D 7/20; B62D 7/18; B62D 7/142; B62D 7/146; B62D 9/00; B25J 5/007; B25J 9/0009
USPC ......................................................... 180/400
See application file for complete search history.

(56) References Cited

FOREIGN PATENT DOCUMENTS

| CN | 111113368 A | * | 5/2020 |
|---|---|---|---|
| KR | 10-1432535 B1 | | 8/2014 |

* cited by examiner

*Primary Examiner* — Tony H Winner
*Assistant Examiner* — Felicia L. Brittman
(74) *Attorney, Agent, or Firm* — Fox Rothschild LLP (57) ABSTRACT

A movable object includes: a body part forming a main body; a wheel provided on a left side or a right side of the body part; a steering module connecting the body part and the wheel, wherein the steering module controls movement of the wheel in a manner that steers the wheel to the left when the wheel moves upward with respect to the body part, and steers the wheel to the right when the wheel moves downward with respect to the body part.

20 Claims, 7 Drawing Sheets

FIG.7

MOVABLE OBJECT WITH STEERING CONTROL

CROSS-REFERENCE TO RELATED APPLICATION

This application claims under 35 U.S.C. § 119(a) the benefit of Korean Patent Application No. 10-2020-0069153, filed on Jun. 8, 2020 in the Korean Intellectual Property Office, the entire contents of which are incorporated by reference herein.

BACKGROUND

(a) Technical Field

The present disclosure relates to a movable object, more particularly, to the movable object that includes a steering module to improve stability and to allow the movable object to rotate freely while moving.

(b) Description of the Related Art

In accordance with the trend of unmanned robots designed to handle existing human tasks, there is an increasing demand for mobile robots capable of carrying goods indoors or outdoors. Accordingly, research has been conducted on robots capable of performing such functions.

Meanwhile, mobile robots need to have capabilities of straight motion (moving forward or rearward), rotational motion (rotating leftward or rightward while moving), and tilting motion (moving in a state of being tilted to one side depending on a condition of the ground). To this end, according to the related art, the mobile robot should be provided with a rotating motor that provides a driving force to rotate the wheels, a steering motor that provides a driving force to steer the wheels, and a tilting motor that provides a driving force to tilt the mobile robot to one side. According to the related art, however, the steering motor and the tilting motor need to be provided separately, which increases the number of motors required to manufacture the mobile robot.

SUMMARY

An aspect of the present disclosure provides a movable object capable of controlling rotational motion and tilting motion using one type of motor, thereby allowing the manufacturing of a mobile robot with a small number of motors.

According to an aspect of the present disclosure, a movable object may include: a body part forming a main body; a wheel provided on a left side or a right side of the body part; a steering module having a first side connected to the body part and a second side connected to the wheel, and controlling steering of the wheel; and a steering drive unit providing a driving force to the steering module, wherein the steering module may control a movement of the wheel in a manner that steers the wheel to left or right when the wheel moves upward or downward with respect to the body part.

The wheel may include a right front wheel provided on the right side of a front area of the body part, the steering module may include a right front steering module connecting the body part and the right front wheel, and the right front steering module may control the movement of the right front wheel in a manner that steers the right front wheel to the right when the right front wheel moves upward with respect to the body part, and that steers the right front wheel to the left when the right front wheel moves downward with respect to the body part.

The wheel may include a left front wheel provided on the left side of the front area of the body part, the steering module may include a left front steering module connecting the body part and the left front wheel, and the left front steering module may control the movement of the left front wheel in a manner that steers the left front wheel to the left when the left front wheel moves upward with respect to the body part, and that steers the left front wheel to the right when the left front wheel moves downward with respect to the body part.

The wheel may include a right rear wheel provided on the right side of a rear area of the body part, the steering module may include a right rear steering module connecting the body part and the right rear wheel, and the right rear steering module may control the movement of the right rear wheel in a manner that steers the right rear wheel to the left when the right rear wheel moves upward with respect to the body part, and that steers the right rear wheel to the right when the right rear wheel moves downward with respect to the body part.

The wheel may include a left rear wheel provided on the left side of the rear area of the body part, the steering module may include a left rear steering module connecting the body part and the left rear wheel, and the left rear steering module may control the movement of the left rear wheel in a manner that steers the left rear wheel to the right when the left rear wheel moves upward with respect to the body part, and that steers the left rear wheel to the left when the left rear wheel moves downward with respect to the body part.

The steering module may include: an upper link provided on an upper portion of the steering module; a wheel-side link provided in the wheel and having an upper edge portion rotatably connected to one end portion of the upper link; a body-side link provided on the body part and having an upper end portion rotatably connected to another end portion of the upper link; and a restraining link having one end portion rotatably connected to a side edge portion of the wheel-side link and another end portion rotatably connected to a lower end portion of the body-side link.

The steering module may include: a lower link provided on a lower portion of the steering module; a wheel-side link provided in the wheel and having a lower edge portion rotatably connected to one end portion of the lower link; a body-side link provided on the body part and having a lower end portion rotatably connected to another end portion of the lower link; and a restraining link having one end portion rotatably connected to a side edge portion of the wheel-side link and another end portion rotatably connected to the lower end portion of the body-side link.

A joint J1 to which the upper link and the wheel-side link are connected may be provided to allow the upper link and the wheel-side link to rotate relative to each other in a horizontal direction or a vertical direction.

A joint J5 to which the lower link and the wheel-side link are connected may be provided to allow the lower link and the wheel-side link to rotate relative to each other in a horizontal direction or a vertical direction.

A joint J6 to which the lower link and the body-side link are connected may be provided to allow the lower link and the body-side link to rotate relative to each other in a vertical direction.

A joint J2 to which the body-side link and the restraining link are connected may be provided to allow the body-side link and the restraining link to rotate relative to each other in a horizontal direction or a vertical direction.

A joint J4 to which the upper link and the body-side link are connected may be provided to allow the upper link and the body-side link to rotate relative to each other in a vertical direction.

A joint J3 to which the wheel-side link and the restraining link are connected may be provided to allow the wheel-side link and the restraining link to rotate relative to each other in a horizontal direction or a vertical direction.

The steering drive unit may provide the driving force to the upper link through the fourth joint so that the upper link may rotate relative to the body-side link at the joint J4 in the vertical direction.

One end portion of the steering drive unit may be rotatably connected to a central portion of the lower link, and another end portion of the steering drive unit may be rotatably connected to an upper end portion of the body-side link, and the steering drive unit may be driven in a manner that adjusts its length from one end portion of the steering drive unit to another end portion thereof, allowing the wheel to move upward or downward with respect to the body part.

The wheel may include a right front wheel provided on the right side of a front area of the body part, and a left front wheel provided on the left side of the front area of the body part, and one end portion of the restraining link connected to the wheel-side link in the steering module connected to each of the right front wheel and the left front wheel may be provided in a rear area of the wheel-side link.

The wheel may include a right rear wheel provided on the right side of a rear area of the body part, and a left rear wheel provided on the left side of the rear area of the body part, and one end portion of the restraining link connected to the wheel-side link in the steering module connected to each of the right rear wheel and the left rear wheel may be provided in a front area of the wheel-side link.

The wheel-side link may include a projection protruding toward the body part, and the restraining link may be rotatably connected to the projection of the wheel-side link.

The upper link and the body-side link may be joined in a plurality of areas spaced apart from each other, and be rotatably connected.

The body part may include: a center body forming a central area of the body part; a right body forming a right area of the body part; a left body forming a left area of the body part; a right connection portion connecting the center body and the right body; and a left connection portion connecting the center body and the left body, wherein the right body may be rotatable around the right connection portion with respect to the center body, and the left body may be rotatable around the left connection portion with respect to the center body.

According to another aspect of the present disclosure, a movable object may include: a body part forming a main body; a wheel provided on a left side or a right side of the body part; a steering module having a first side connected to the body part and a second side connected to the wheel, and controlling steering of the wheel; and a steering drive unit providing a driving force to the steering module, wherein the steering module may include: an upper link provided on an upper portion of the steering module; a wheel-side link provided in the wheel and having an upper edge portion rotatably connected to one end portion of the upper link; a body-side link provided on the body part and having an upper end portion rotatably connected to another end portion of the upper link; and a restraining link having one end portion rotatably connected to a side edge portion of the wheel-side link and another end portion rotatably connected to a lower end portion of the body-side link.

According to another aspect of the present disclosure, a movable object may include: a body part forming a main body; a wheel provided on a left side or a right side of the body part; a steering module having one side connected to the body part and another side connected to the wheel, and controlling steering of the wheel; and a steering drive unit providing a driving force to the steering module, wherein the steering module may include: a lower link provided on a lower portion of the steering module; a wheel-side link provided in the wheel and having a lower edge portion rotatably connected to one end portion of the lower link; a body-side link provided on the body part and having a lower end portion rotatably connected to another end portion of the lower link; and a restraining link having one end portion rotatably connected to a side edge portion of the wheel-side link and another end portion rotatably connected to the lower end portion of the body-side link.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the structure and operations of a movable object according to exemplary embodiments of the present disclosure will be described in detail with reference to the accompanying drawings.

Movable Object

Figure 1:
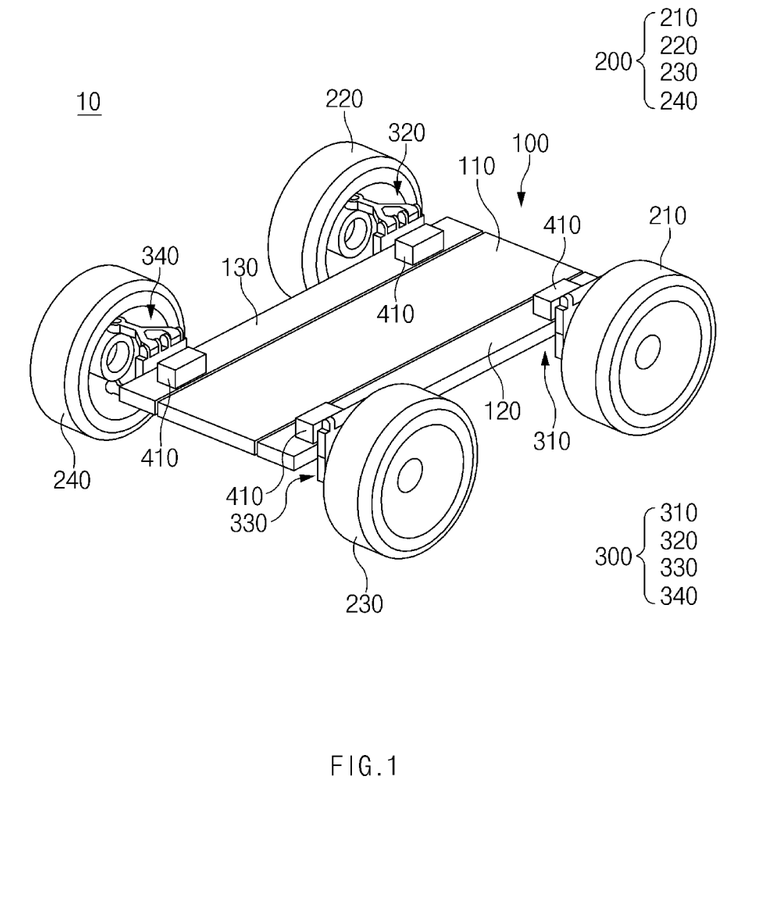
FIG. 1 is a perspective view illustrating a structure of a movable object according to an exemplary embodiment of the present disclosure.

FIG. 1 is a perspective view illustrating the structure of a movable object according to an exemplary embodiment of the present disclosure.

A movable object 10 according to an exemplary embodiment of the present disclosure may be designed to carry equipment, goods, or cargo indoors or outdoors. For example, the movable object 10 may deliver goods outdoors.

As illustrated in FIG. 1, the movable object 10 according to an exemplary embodiment of the present disclosure may include a body part 100 forming a main body of the movable object 10, and at least one wheel 200 provided on the left and/or right side of the body part 100. The movable object may be provided with the plurality of wheels 200. More preferably, the wheels 200 may be provided on both the left and right sides of the body part 100.

For example, the wheels 200 may include a right front wheel 210 provided on the right side of a front area of the body part 100, a left front wheel 220 provided on the left side of the front area of the body part 100, a right rear wheel 230 provided on the right side of a rear area of the body part 100, and a left rear wheel 240 provided on the left side of the rear area of the body part 100. FIG. 1 illustrates the movable object 10 having four wheels according to an exemplary embodiment of the present disclosure, but the number of wheels of the movable object 10 according to exemplary embodiments of the present disclosure is not limited thereto.

Meanwhile, although not shown, the movable object 10 may further include an in-wheel motor providing a rotational force to the wheel 200 to allow the wheel 200 to rotate. The in-wheel motor may be provided inside each wheel 200. Since there are the plurality of wheels 200 as mentioned above, the wheels 200 may also include the plurality of in-wheel motors provided therein, respectively.

Figure 2:
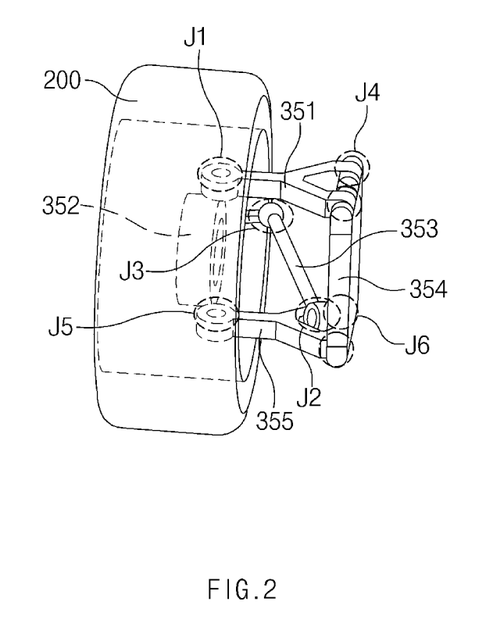
FIG. 2 is an enlarged perspective view illustrating the connections of a wheel, a steering module, and a body part in a movable object according to an exemplary embodiment of the present disclosure.
Figure 3:
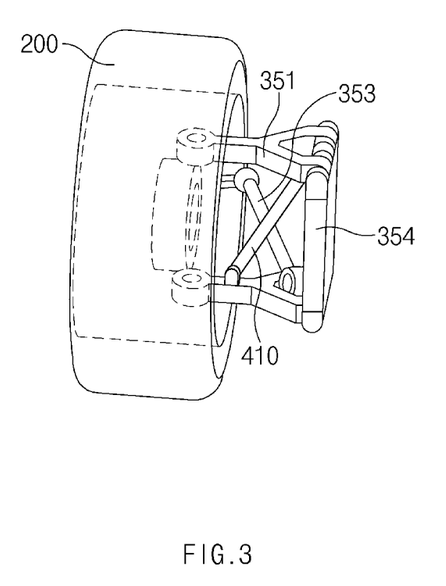
FIG. 3 is an enlarged perspective view illustrating the connections of a wheel, a steering module, and a body part in a movable object according to another exemplary embodiment of the present disclosure.

FIG. 2 is an enlarged perspective view illustrating the connections of a wheel, a steering module, and a body part in a movable object according to an exemplary embodiment of the present disclosure, and FIG. 3 is an enlarged perspective view illustrating the connections of a wheel, a steering module, and a body part in a movable object according to another exemplary embodiment of the present disclosure.

Referring to FIGS. 1 to 3, the movable object 10 according to an exemplary embodiment of the present disclosure may further include a steering module 300 having a first side connected to the body part 100 and a second side connected to the wheel 200, and a steering drive unit 410 providing a driving force to the steering module 300. The steering drive unit 410 may be a motor converting electrical energy into kinetic energy. According to another exemplary embodiment of the present disclosure, the steering drive unit 410 may be a hydraulic or pneumatic cylinder to be described below.

The steering module 300 in the movable object 10 according to exemplary embodiments of the present disclosure may control the steering of the wheel 200 and control the wheel 200 to move upward or downward with respect to the body part 100, thereby controlling the rotational motion and tilting motion of the movable object 10.

In particular, according to exemplary embodiments of the present disclosure, the steering module 300 may control the leftward or rightward movement of the wheel 200 and the upward or downward movement of the wheel 200 with respect to the body part 100 in a dependent manner, rather than independently of each other.

That is, according to exemplary embodiments of the present disclosure, the movement of the wheel 200 may be controlled in the following manner: when the wheel 200 moves upward or downward with respect to the body part 100, the wheel 200 may also be steered to the left or right.

For example, according to exemplary embodiments of the present disclosure, the steering module 300 may control the movement of the wheel 200 as follows: when the wheel 200 moves upward with respect to the body part 100, the wheel 200 may be steered to the left, and when the wheel 200 moves downward with respect to the body part 100, the wheel 200 may be steered to the right.

Alternatively, according to exemplary embodiments of the present disclosure, the steering module 300 may control the movement of the wheel 200 as follows: when the wheel 200 moves upward with respect to the body part 100, the wheel 200 may be steered to the right, and when the wheel 200 moves downward with respect to the body part 100, the wheel 200 may be steered to the left.

More preferably, the steering module 300 may control the movements of the wheels 200 differently depending on types of the wheels 200 to which the steering module 300 is connected.

For example, as illustrated in FIG. 1, the steering module 300 may include a right front steering module 310 connecting the body part 100 and the right front wheel 210. Here, the right front steering module 310 may control the movement of the right front wheel 210 as follows: when the right front wheel 210 moves upward with respect to the body part 100, the right front wheel 210 may be steered to the right, and when the right front wheel 210 moves downward with respect to the body part 100, the right front wheel 210 may be steered to the left.

In addition, the steering module 300 may include a left front steering module 320 connecting the body part 100 and the left front wheel 220. Here, the left front steering module 320 may control the movement of the left front wheel 220 as follows: when the left front wheel 220 moves upward with respect to the body part 100, the left front wheel 220 may be steered to the left, and when the left front wheel 220 moves downward with respect to the body part 100, the left front wheel 220 may be steered to the right.

Referring to FIG. 1, the steering module 300 may include a right rear steering module 330 connecting the body part 100 and the right rear wheel 230. Here, the right rear steering module 330 may control the movement of the right rear wheel 230 as follows: when the right rear wheel 230 moves upward with respect to the body part 100, the right rear wheel 230 may be steered to the left, and when the right rear wheel 230 moves downward with respect to the body part 100, the right rear wheel 230 may be steered to the right.

In addition, the steering module 300 may include a left rear steering module 340 connecting the body part 100 and the left rear wheel 240. Here, the left rear steering module 340 may control the movement of the left rear wheel 240 as follows: when the left rear wheel 240 moves upward with respect to the body part 100, the left rear wheel 240 may be steered to the right, and when the left rear wheel 240 moves downward with respect to the body part 100, the left rear wheel 240 may be steered to the left. Hereinafter, the configuration of the steering module 300 will be described in more detail.

Referring to FIGS. 2 and 3, the steering module 300 may include an upper link 351 provided on an upper portion of the steering module 300 and a wheel-side link 352 provided in the wheel 200 and having an edge rotatably connected to one end portion of the upper link 351. The wheel-side link 352 may be fixed to the wheel 200. Alternatively, the wheel-side link 352 may be part of the wheel 200. In this case, the wheel-side link 352 may be part of the steering module 300 and part of the wheel 200.

In addition, the steering module 300 may further include a body-side link 354 provided on the body part 100 and having an upper end portion rotatably connected to another end portion of the upper link 351. The body-side link 354 may be fixed to the body part 100. Alternatively, the body-side link 354 may be part of the body part 100. In this case, the body-side link 354 may be part of the steering module 300 and part of the body part 100.

In addition, the steering module 300 may further include a restraining link 353 having one end portion rotatably connected to a side edge portion of the wheel-side link 352 and another end portion rotatably connected to a lower end portion of the body-side link 354.

In addition, the steering module 300 may further include a lower link 355 provided on a lower portion of the steering module 300. Here, a lower edge portion of the wheel-side link 352 may be rotatably connected to one end portion of the lower link 355, and the lower end portion of the body-side link 354 may be rotatably connected to another end portion of the lower link 355. Hereinafter, joints for connecting the links of the steering module will be described in more detail.

Referring to FIGS. 2 and 3, when a joint J1 to which the upper link 351 and the wheel-side link 352 are connected is referred to as a first joint, the first joint J1 may be provided to allow the upper link 351 and the wheel-side link 352 to rotate relative to each other in a horizontal direction and a vertical direction. It may be understood that the wheel-side link 352 may be allowed to pivot horizontally and vertically in a state of being fixed relative to the upper link 351 at the first joint J1, and that the upper link 351 may also be allowed to pivot horizontally and vertically in a state of being fixed relative to the wheel-side link 352 at the first joint J1. To perform the pivot movement, the upper link 351 and the wheel-side link 352 may be connected by a spherical joint at the first joint J1. For example, as illustrated in FIGS. 2 and 3, the first joint J1 may have a structure in which a ball formed on an upper edge portion of the wheel-side link 352 is received in a case formed on one end portion of the upper link 351.

Meanwhile, when a joint J2 to which the body-side link 354 and the restraining link 353 are connected is referred to as a second joint, the second joint J2 may be provided to allow the body-side link 354 and the restraining link 353 to rotate relative to each other in a horizontal direction and a vertical direction. Similar to the first joint J1, the body-side link 354 and the restraining link 353 may be connected by a spherical joint at the second joint J2. For example, as illustrated in FIGS. 2 and 3, the second joint J2 may have a structure in which a ball formed on another end portion of the restraining link 353 is received in a case formed on the lower end portion of the body-side link 354.

Meanwhile, when a joint J3 to which the wheel-side link 352 and the restraining link 353 are connected is referred to as a third joint, the third joint J3 may be provided to allow the wheel-side link 352 and the restraining link 353 to rotate relative to each other in a horizontal direction and a vertical direction. Similar to the first joint J1 and the second joint J2, the wheel-side link 352 and the restraining link 353 may be connected by a spherical joint at the third joint J3. For example, as illustrated in FIGS. 2 and 3, the third joint J3 may have a structure in which a ball formed on one end portion of the restraining link 353 is received in a case formed on the side edge portion of the wheel-side link 352. More preferably, as illustrated in FIGS. 2 and 3, the wheel-side link 352 may be provided with a rod-shaped projection protruding toward the body part 100 (see FIG. 1), and the restraining link 353 may be rotatably connected to the projection of the wheel-side link 352. This may be to prevent the restraining link 353 from interfering with the wheel 200 during the steering process of the wheel 200, and to form a moment arm equal to the length of the projection and allow the restraining link 353 to move smoothly in accordance with the movement of the wheel-side link 352 during the steering process of the wheel 200.

Meanwhile, when a joint J4 to which the upper link 351 and the body-side link 354 are connected is referred to as a fourth joint, the fourth joint J4 may be provided to allow the upper link 351 and the body-side link 354 to rotate relative to each other in a vertical direction. It may be understood that the upper link 351 may be allowed to pivot vertically on a rotating shaft formed horizontally in a state of being fixed relative to the body-side link 354 at the fourth joint J4, and that the body-side link 354 may also be allowed to pivot vertically on the rotating shaft formed horizontally in a state of being fixed relative to the upper link 351 at the fourth joint J4. To perform the pivot movement, the upper link 351 and the body-side link 354 may be connected by a revolute joint at the fourth joint J4. Referring to FIGS. 2 and 3, the upper link 351 and the body-side link 354 may be joined in a plurality of areas that are spaced apart from each other, and be rotatably connected. FIGS. 2 and 3 illustrate the upper link 351 and the body-side link 354 rotatably connected in two areas that are spaced apart from each other. To this end, the upper link 351 may have a Y-shape which is symmetrical in a left-right direction, and two of three ends of the Y-shaped upper link 351 may be connected to the body-side link 354.

Meanwhile, when a joint J5 to which the lower link 355 and the wheel-side link 352 are connected is referred to as a fifth joint, the fifth joint J5 may be provided to allow the lower link 355 and the wheel-side link 352 to rotate relative to each other in a horizontal direction and a vertical direction. Similar to the first, second, and third joints J1, J2, and J3, the lower link 355 and the wheel-side link 352 may be connected by a spherical joint at the fifth joint J5. For example, as illustrated in FIGS. 2 and 3, the fifth joint J5 may have a structure in which a ball formed on the lower edge portion of the wheel-side link 352 is received in a case formed on one end portion of the lower link 355.

Meanwhile, when a joint J6 to which the lower link 355 and the body-side link 354 are connected is referred to as a sixth joint, the sixth joint J6 may be provided to allow the lower link 355 and the body-side link 354 to rotate relative to each other in a vertical direction. Similar to the fourth joint J4, the lower link 355 and the body-side link 354 may be connected by a revolute joint at the sixth joint J6. Referring to FIGS. 2 and 3, the lower link 355 and the body-side link 354 may be joined in a plurality of areas that are spaced apart from each other, and be rotatably connected. FIGS. 2 and 3 illustrate the lower link 355 and the body-side link 354 rotatably connected in two areas that are spaced apart from each other. To this end, the lower link 355 may have a Y-shape which is symmetrical in a left-right direction, and two of three ends of the Y-shaped lower link 355 may be connected to the body-side link 354. Meanwhile, since the upper link 351 also has the Y-shape as mentioned above, the upper link 351 and the lower link 355 may be compatible equivalents.

Meanwhile, referring to FIGS. 1 and 2, the steering drive unit 410 in the movable object 10 according to an exemplary embodiment of the present disclosure may provide a driving force to the upper link 351 through the fourth joint J4 so that the upper link 351 may rotate relative to the body-side link 354 at the fourth joint J4 in the vertical direction. For example, according to an exemplary embodiment of the present disclosure, when the steering drive unit 410 is a motor, the steering drive unit 410 may be provided on the body part 100, and a gear provided on the horizontal rotating shaft formed at the fourth joint J4 may engage with a rotating shaft of the steering drive unit 410. Here, when the steering drive unit 410 is driven, the rotating shaft of the steering drive unit 410 may rotate, allowing the rotating shaft provided at the fourth joint J4 to rotate together. Thus, a relative rotation between the upper link 351 and the body-side link 354 may occur in the vertical direction, and accordingly, the wheel 200 may move upward and downward relative to the body part 100.

On the other hand, referring to FIG. 3, the steering drive unit 410 in the movable object 10 according to another exemplary embodiment of the present disclosure may have a structure different from that of the steering drive unit 410 according to the preceding embodiment of the present disclosure. For example, referring to FIG. 3, according to another exemplary embodiment of the present disclosure, one end portion of the steering drive unit 410 may be connected to a central portion of the lower link 355 to be rotatable in the vertical direction, and another end portion of the steering drive unit 410 may be connected to the upper end portion of the body-side link 354 to be rotatable in the vertical direction. More preferably, one end portion and another end portion of the steering drive unit 410 may be connected to the lower link 355 and the body-side link 354 by revolute joints, respectively. More preferably, as illustrated in FIG. 3, another end portion of the steering drive unit 410 may be connected to the body-side link 354 between the plurality of areas of the fourth joint J4 (see FIG. 2). Here, the steering drive unit 410 may be driven in a manner that adjusts its length from one end portion of the steering drive unit 410 to another end portion thereof, thereby controlling the upward and downward movements of the wheel 200 with respect to the body part 100. That is, when the steering drive unit 410 is driven in a manner that reduces the length thereof, the wheel 200 may move upward with respect to the body part 100, and when the steering drive unit 410 is driven in a manner that increases the length thereof, the wheel 200 may move downward with respect to the body part 100.

Figure 4:
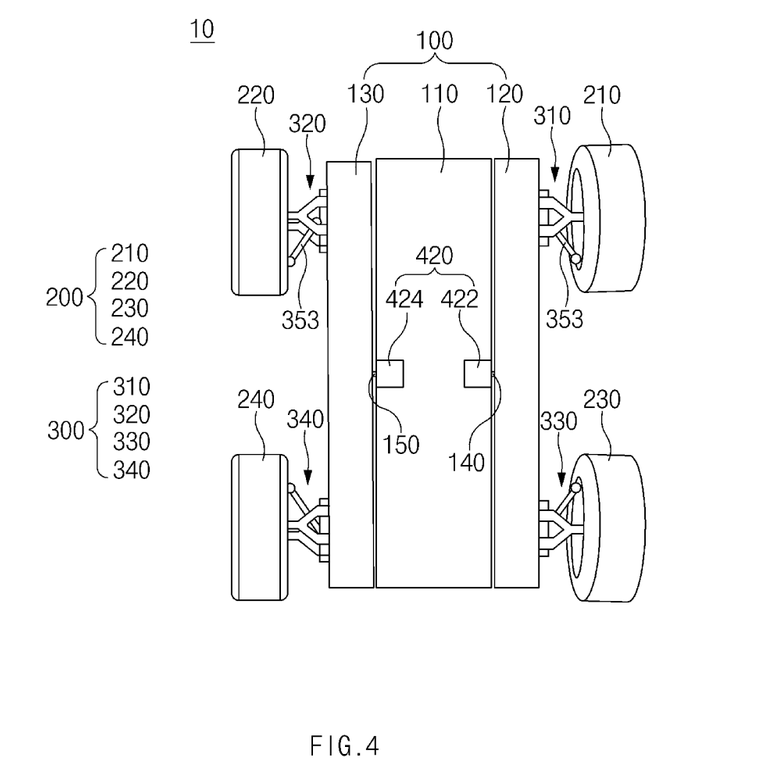
FIG. 4 is a perspective view illustrating a structure of a movable object according to another exemplary embodiment of the present disclosure.
Figure 5:
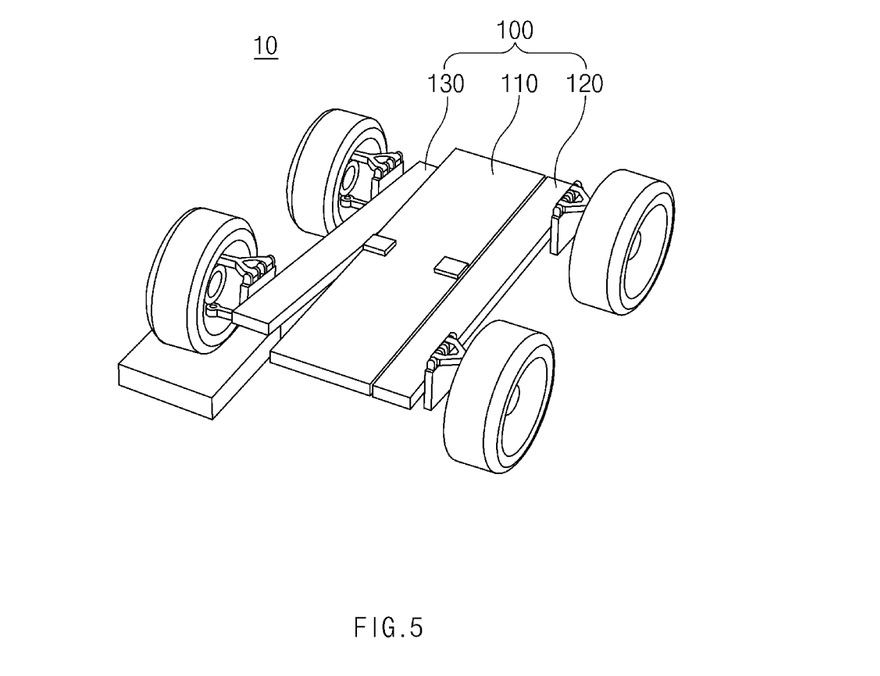
FIG. 5 is a perspective view illustrating rotational motion of a body part of a movable object according to another exemplary embodiment of the present disclosure depending on the condition of the ground.

FIG. 4 is a perspective view illustrating a structure of a movable object according to another exemplary embodiment of the present disclosure, and FIG. 5 is a perspective view illustrating the rotational motion of a body part of a movable object according to another exemplary embodiment of the present disclosure depending on the condition of the ground.

Meanwhile, as described above, the wheels 200 may include the right front wheel 210 and the left front wheel 220. Here, according to exemplary embodiments of the present disclosure, one end portion of the restraining link 353 adjacent to the wheel 200 in each of the right front steering module 310 and the left front steering module 320 which are connected to the right front wheel 210 and the left front wheel 220, respectively, may be provided on the rear of the corresponding wheel 200. Thus, the side edge portion of the wheel-side link 352 connected to the restraining link 353 in each of the right front steering module 310 and the left front steering module 320 may be provided in a rear area of the wheel-side link 352 (see FIG. 4).

In addition, as described above, the wheels 200 may include the right rear wheel 230 and the left rear wheel 240. Here, according to exemplary embodiments of the present disclosure, one end portion of the restraining link 353 adjacent to the wheel 200 in each of the right rear steering module 330 and the left rear steering module 340, which are connected to the right rear wheel 230 and the left rear wheel 240, respectively, may be provided on the front of the corresponding wheel 200. Thus, the side edge portion of the wheel-side link 352 connected to the restraining link 353 in each of the right rear steering module 330 and the left rear steering module 340 may be provided in a front area of the wheel-side link 352 (see FIG. 4).

Referring to FIGS. 2 and 4, when the wheel 200 moves upward with respect to the body part 100, one end portion and another end portion of the restraining link 353 connected to the wheel-side link 352 and the body-side link 354 may tend to be far away from each other. However, since the length of the restraining link 353 is limited, one end portion of the restraining link 353 connected to the wheel-side link 352 may be pulled toward the body part 100. As described above, when one end portion of the restraining link 353 connected to the wheel-side link 352 in each of the right front steering module 310 and the left front steering module 320 is provided in the rear area of the wheel-side link 352, front portions of the right front wheel 210 and the left front wheel 220 may move far away from the body part 100. In addition, when one end portion of the restraining link 353 connected to the wheel-side link 352 in each of the right rear steering module 330 and the left rear steering module 340 is provided in the front area of the wheel-side link 352, front portions of the right rear wheel 230 and the left rear wheel 240 may move close to the body part 100.

Thus, the right front steering module 310 may control the movement of the right front wheel 210 in a manner that steers the right front wheel 210 to the right when the right front wheel 210 moves upward with respect to the body part 100 and that steers the right front wheel 210 to the left when the right front wheel 210 moves downward with respect to the body part 100. In addition, the left front steering module 320 may control the movement of the left front wheel 220 in a manner that steers the left front wheel 220 to the left when the left front wheel 220 moves upward with respect to the body part 100 and that steers the left front wheel 220 to the right when the left front wheel 220 moves downward with respect to the body part 100. In addition, the right rear steering module 330 may control the movement of the right rear wheel 230 in a manner that steers the right rear wheel 230 to the left when the right rear wheel 230 moves upward with respect to the body part 100 and that steers the right rear wheel 230 to the right when the right rear wheel 230 moves downward with respect to the body part 100. In addition, the left rear steering module 340 may control the movement of the left rear wheel 240 in a manner that steers the left rear wheel 240 to the right when the left rear wheel 240 moves upward with respect to the body part 100 and that steers the left rear wheel 240 to the left when the left rear wheel 240 moves downward with respect to the body part 100.

Meanwhile, referring to FIGS. 4 and 5, the body part 100 in the movable object 10 according to an exemplary embodiment of the present disclosure may include a center body 110 forming a central area of the body part 100, a right body 120 forming a right area of the body part 100, a left body 130 forming a left area of the body part 100, a right connection portion 140 connecting the center body 110 and the right body 120, and a left connection portion 150 connecting the center body 110 and the left body 130.

Each of the right body 120 and the left body 130 may be rotatable with respect to the center body 110. More specifically, the right body 120 may be rotatable around the right connection portion 140 with respect to the center body 110 in a vertical direction, and the left body 130 may be rotatable around the left connection portion 150 with respect to the center body 110 in the vertical direction. Here, the rotational motion around the right connection portion 140 and the left connection portion 150 may be made independently of each other.

When the right body 120 and the left body 130 are individually rotatable with respect to the center body 110, the movable object 10 may move and pass smoothly even if there is an uneven ground or an obstacle on the ground while the movable object 10 is moving. For example, as illustrated in FIG. 5, when there is an obstacle in front of the right side of the movable object 10 on the ground on which the movable object 10 is travelling, the left body 130 may rotate relative to the center body 110 so that the movable object 10 may pass through the obstacle smoothly.

Referring to FIGS. 4 and 5, the movable object 10 may further include a body drive unit 420 including a right body driver 422 providing a driving force allowing the right body 120 to be relatively rotatable around the right connection portion 140 with respect to the center body 110, and a left body driver 424 providing a driving force allowing the left body 130 to be relatively rotatable around the left connection portion 150 with respect to the center body 110. When the movable object 10 moves on the uneven ground or there is an obstacle on the ground, the movable object 10 may actively respond to the condition of the ground by providing a rotational force to the right body 120 or the left body 130.

Meanwhile, as illustrated in FIG. 4, the right connection portion 140 may be provided on a central area between the center body 110 and the right body 120, and the left connection portion 150 may be provided on a central area between the center body 110 and the left body 130. Alternatively, the right connection portion 140 may be provided on a front or rear area between the center body 110 and the right body 120, and the left connection portion 150 may be provided on a front or rear area between the center body 110 and the left body 130.

Figure 6:
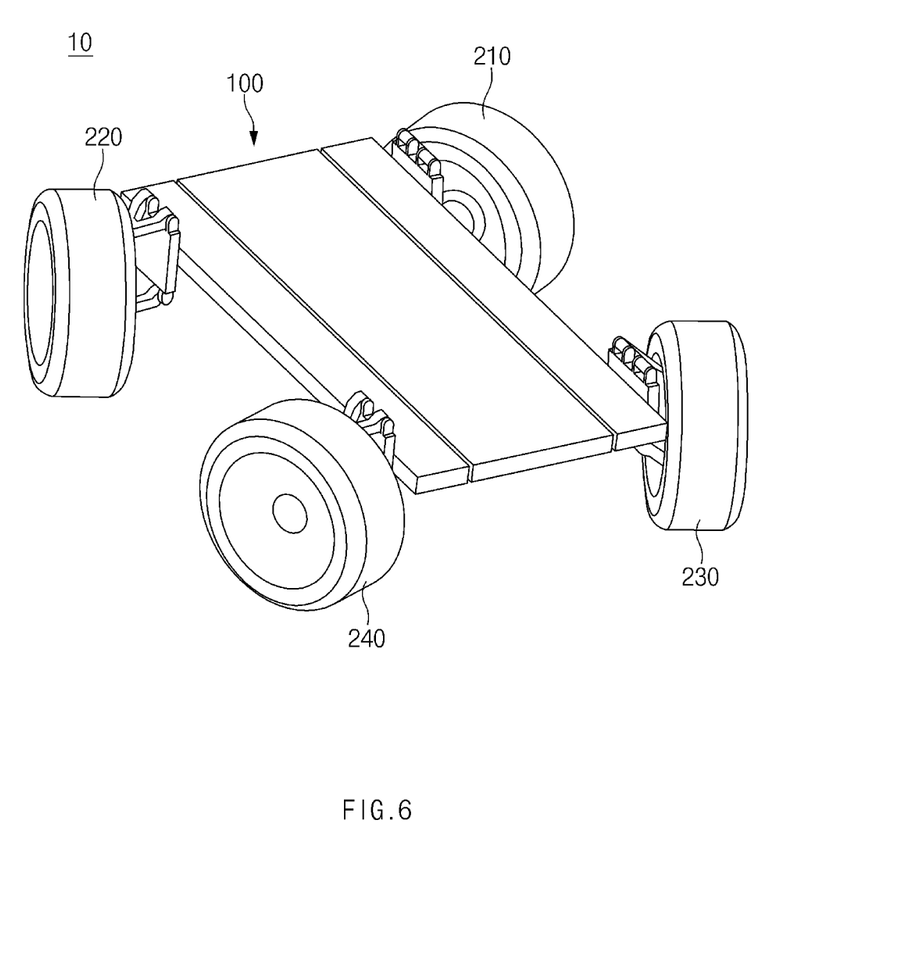
FIG. 6 is a perspective view illustrating a first driving example of a movable object according to an exemplary embodiment of the present disclosure.
Figure 7:
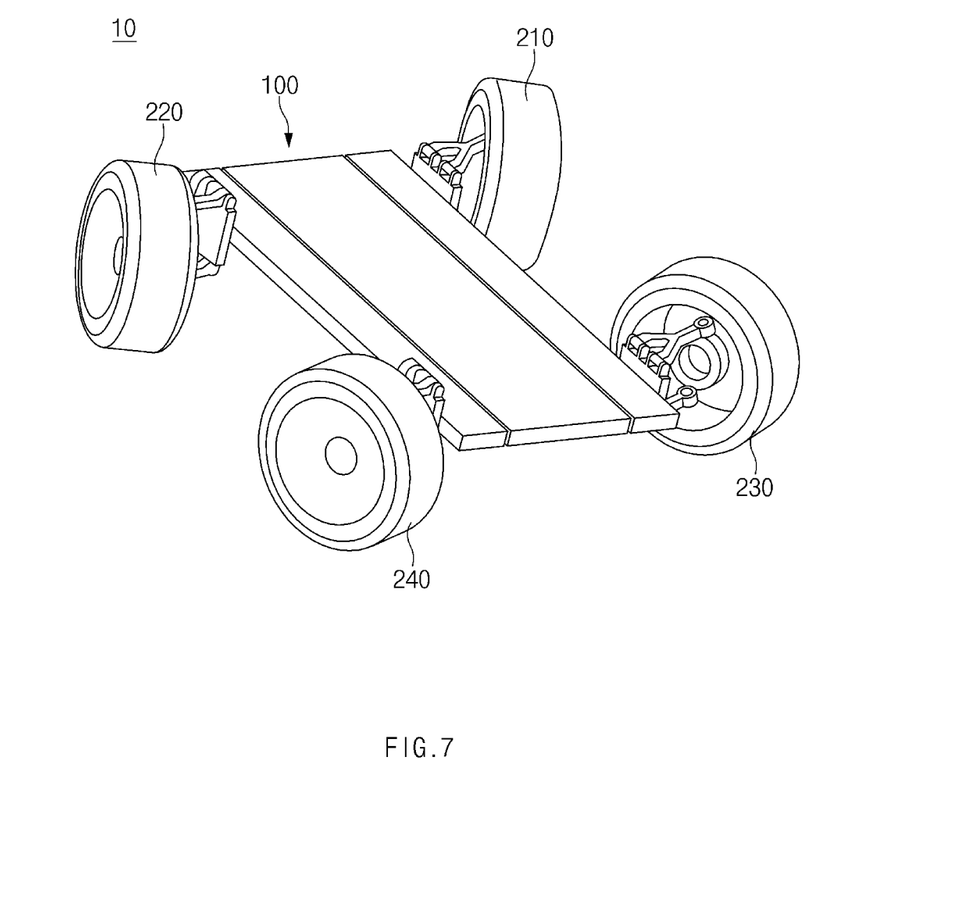
FIG. 7 is a perspective view illustrating a second driving example of a movable object according to an exemplary embodiment of the present disclosure.

FIG. 6 is a perspective view illustrating a first driving example of a movable object according to an exemplary embodiment of the present disclosure, and FIG. 7 is a perspective view illustrating a second driving example of a movable object according to an exemplary embodiment of the present disclosure.

In the first driving example illustrated in FIG. 6, the movable object 10 according to an exemplary embodiment of the present disclosure may be driven to rotate in place. That is, the movable object 10 may steer the wheels through the steering module provided in each wheel in a manner that allows the front portions of the right front wheel 210 and the left front wheel 220 to be steered close to the body part 100, and that allows the front portions of the left rear wheel 240 and the right rear wheel 230 to be steered away from the body part 100.

In this state, when the right front wheel 210 and the right rear wheel 230 rotate in a forward direction, and the left front wheel 220 and the left rear wheel 240 rotate in a reverse direction, the movable object 10 may rotate in place counterclockwise based on FIG. 6. On the other hand, when the right front wheel 210 and the right rear wheel 230 rotate in the reverse direction, and the left front wheel 220 and the left rear wheel 240 rotate in the forward direction, the movable object 10 may rotate in place clockwise based on FIG. 6.

Referring to FIG. 6, when the right front wheel 210 and the left rear wheel 240 are steered to the left by a predetermined angle, and the left front wheel 220 and the right rear wheel 230 are steered to the right by a predetermined angle, the body part 100 may be parallel to the ground. To this end, the connections of the links and the joints of the right front steering module, the left front steering module, the right rear steering module, and the left rear steering module may be symmetrically formed with respect to the body part 100.

Meanwhile, in the second driving example illustrated in FIG. 7, the movable object 10 according to an exemplary embodiment of the present disclosure may be steered to the right while moving forward. That is, as illustrated in FIG. 7, the movable object 10 may steer the wheels through the steering module provided in each wheel in a manner that allows the front portions of the right front wheel 210 and the left rear wheel 240 to be steered away from the body part 100, and that allows the front portions of the left front wheel 220 and the right rear wheel 230 to be steered close to the body part 100.

In this state, when all of the wheels rotate while moving forward, the movable object 10 may be steered to the right.

On the other hand, in order for the movable object 10 according to an exemplary embodiment of the present disclosure to be steered to the left while moving forward, it may be necessary for all of the wheels to rotate while moving forward in a state in which the front portions of the right front wheel 210 and the left rear wheel 240 are steered close to the body part 100, and the front portions of the left front wheel 220 and the right rear wheel 230 are steered away from the body part 100, unlike the state as illustrated in FIG. 7.

As set forth above, the movable object according to exemplary embodiments of the present disclosure may be capable of controlling rotational motion and tilting motion using one type of motor, thereby allowing the manufacturing of a mobile robot with a small number of motors.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A movable object, comprising:
    a body part forming a main body;
    a wheel provided on a left side or a right side of the body part;
    a steering module having a first side connected to the body part and a second side connected to the wheel, and controlling steering of the wheel; and
    a steering drive unit providing a driving force to the steering module,
    wherein the steering module controls a movement of the wheel in a manner that steers the wheel to left or right when the wheel moves upward or downward with respect to the body part.

2. The movable object according to claim 1, wherein the wheel includes a right front wheel provided on the right side of a front area of the body part,
    the steering module includes a right front steering module connecting the body part and the right front wheel, and
    the right front steering module controls the movement of the right front wheel in a manner that steers the right front wheel to the right when the right front wheel moves upward with respect to the body part, and that steers the right front wheel to the left when the right front wheel moves downward with respect to the body part.

3. The movable object according to claim 2, wherein the wheel includes a left front wheel provided on the left side of the front area of the body part,
    the steering module includes a left front steering module connecting the body part and the left front wheel, and
    the left front steering module controls the movement of the left front wheel in a manner that steers the left front wheel to the left when the left front wheel moves upward with respect to the body part, and that steers the left front wheel to the right when the left front wheel moves downward with respect to the body part.

4. The movable object according to claim 3, wherein the wheel includes a right rear wheel provided on the right side of a rear area of the body part,
    the steering module includes a right rear steering module connecting the body part and the right rear wheel, and
    the right rear steering module controls the movement of the right rear wheel in a manner that steers the right rear wheel to the left when the right rear wheel moves upward with respect to the body part, and that steers the right rear wheel to the right when the right rear wheel moves downward with respect to the body part.

5. The movable object according to claim 4, wherein the wheel includes a left rear wheel provided on the left side of the rear area of the body part,
    the steering module includes a left rear steering module connecting the body part and the left rear wheel, and
    the left rear steering module controls the movement of the left rear wheel in a manner that steers the left rear wheel to the right when the left rear wheel moves upward with respect to the body part, and that steers the left rear wheel to the left when the left rear wheel moves downward with respect to the body part.

6. The movable object according to claim 1, wherein the steering module includes:
    an upper link provided on an upper portion of the steering module;
    a wheel-side link provided in the wheel and having an upper edge portion rotatably connected to one end portion of the upper link;
    a body-side link provided on the body part and having an upper end portion rotatably connected to another end portion of the upper link; and
    a restraining link having one end portion rotatably connected to a side edge portion of the wheel-side link and another end portion rotatably connected to a lower end portion of the body-side link.

7. The movable object according to claim 6, wherein a joint J1 to which the upper link and the wheel-side link are connected is provided to allow the upper link and the wheel-side link to rotate relative to each other in a horizontal direction or a vertical direction.

8. The movable object according to claim 6, wherein a joint J2 to which the body-side link and the restraining link are connected is provided to allow the body-side link and the restraining link to rotate relative to each other in a horizontal direction or a vertical direction.

9. The movable object according to claim 6, wherein a joint J4 to which the upper link and the body-side link are connected is provided to allow the upper link and the body-side link to rotate relative to each other in a vertical direction.

10. The movable object according to claim 9, wherein the steering drive unit provides the driving force to the upper link through the fourth joint so that the upper link rotates relative to the body-side link at the joint J4 in the vertical direction.

11. The movable object according to claim 6, wherein a joint J3 to which the wheel-side link and the restraining link are connected is provided to allow the wheel-side link and the restraining link to rotate relative to each other in a horizontal direction or a vertical direction.

12. The movable object according to claim 6, wherein the wheel includes a right front wheel provided on the right side of a front area of the body part, and a left front wheel provided on the left side of the front area of the body part, and
    one end portion of the restraining link connected to the wheel-side link in the steering module connected to each of the right front wheel and the left front wheel is provided in a rear area of the wheel-side link.

13. The movable object according to claim 6, wherein the wheel includes a right rear wheel provided on the right side of a rear area of the body part, and a left rear wheel provided on the left side of the rear area of the body part, and
    one end portion of the restraining link connected to the wheel-side link in the steering module connected to each of the right rear wheel and the left rear wheel is provided in a front area of the wheel-side link.

14. The movable object according to claim 6, wherein the wheel-side link includes a projection protruding toward the body part, and the restraining link is rotatably connected to the projection of the wheel-side link.

15. The movable object according to claim 6, wherein the upper link and the body-side link are joined in a plurality of areas spaced apart from each other, and are rotatably connected.

16. The movable object according to claim 1, wherein the steering module includes:
- a lower link provided on a lower portion of the steering module;
- a wheel-side link provided in the wheel and having a lower edge portion rotatably connected to one end portion of the lower link;
- a body-side link provided on the body part and having a lower end portion rotatably connected to another end portion of the lower link; and
- a restraining link having one end portion rotatably connected to a side edge portion of the wheel-side link and another end portion rotatably connected to the lower end portion of the body-side link.

17. The movable object according to claim 16, wherein a joint J5 to which the lower link and the wheel-side link are connected is provided to allow the lower link and the wheel-side link to rotate relative to each other in a horizontal direction or a vertical direction.

18. The movable object according to claim 16, wherein a joint J6 to which the lower link and the body-side link are connected is provided to allow the lower link and the body-side link to rotate relative to each other in a vertical direction.

19. The movable object according to claim 16, wherein one end portion of the steering drive unit is rotatably connected to a central portion of the lower link, and another end portion of the steering drive unit is rotatably connected to an upper end portion of the body-side link, and
the steering drive unit is driven in a manner that adjusts its length from one end portion of the steering drive unit to another end portion thereof, allowing the wheel to move upward or downward with respect to the body part.

20. The movable object according to claim 1, wherein the body part includes:
- a center body forming a central area of the body part;
- a right body forming a right area of the body part;
- a left body forming a left area of the body part;
- a right connection portion connecting the center body and the right body; and
- a left connection portion connecting the center body and the left body,
wherein the right body is rotatable around the right connection portion with respect to the center body, and the left body is rotatable around the left connection portion with respect to the center body.

* * * * *